Aug. 25, 1931.  H. H. HILL  1,820,802
BIRD CAGE FOOD HOLDER
Filed Sept. 12, 1929

Inventor:
Harry H. Hill
By Walter M. Fuller
Atty

Patented Aug. 25, 1931

1,820,802

UNITED STATES PATENT OFFICE

HARRY H. HILL, OF CHICAGO, ILLINOIS, ASSIGNOR OF ONE-HALF TO GABRIEL LIPMAN, OF CHICAGO, ILLINOIS

BIRD-CAGE FOOD-HOLDER

Application filed September 12, 1929. Serial No. 392,088.

My present invention relates to an appliance or clasp for holding edible articles in bird-cages in position for easy access of the occupant of the enclosure.

The improved and novel holder is especially adapted for supporting or sustaining a piece of cuttlefish, apple, lettuce, celery, or the like, in appropriate manner while the bird feeds thereon, but it is to be understood that it is not necessarily limited or restricted to such particular employment.

One aim or purpose of the invention is to provide a holder or clamp of this general type or character which is simple in structure, which may be manufactured at small cost, which is easily operated, which holds the food firmly and securely, and which is unlikely to afford means whereby the bird may injure itself.

To the attainment of these and other desirable objects, I have produced a holder of this character, a preferred embodiment of which is illustrated in detail in the accompanying drawings forming a part of this specification, and to which reference should be had in connection with the following detailed description, like reference numerals, for simplicity, being employed to designate the same parts throughout the several views.

Figure 1:
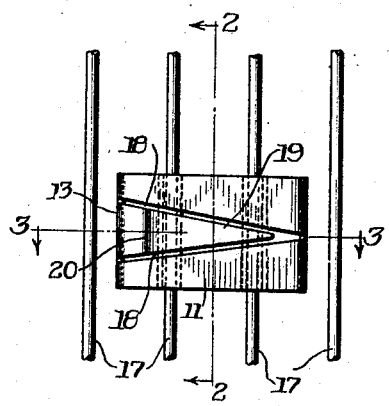
Figure 1 is a face view of the clamp showing it applied to the bars of a bird-cage.
Figure 2:
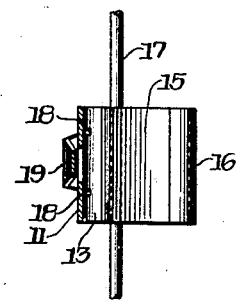
Figure 2 is a vertical section on line 2—2 of Figure 1.

Referring to the drawings, it will be perceived that the clamp or holder, which is desirably and preferably, but not necessarily, made of a single piece of resilient or elastic metal, comprises a main, flat or plane, body section 11 and bent, end portions, characterized as a whole 12, 12, each of which extends outwardly a short distance at 13, then substantially parallel to the main section 11 at 14, then outwardly somewhat curved at 15, terminating in a bent, finished end 16.

The two, flexible or springy arms or finger pieces 12, 12 naturally tend to separate enough to firmly engage the adjacent bars or rods 17, 17 of the bird-cage when inserted between them, and, in this manner, they are adapted to support the entire clasp or holder by their frictional and clamp relation with the bars.

To insert or introduce such arms or projections between the bird-cage bars, they are temporarily squeezed or pressed toward one another by the operator, and, when they are in proper place or correct position, they are released, whereupon, in expanding or separating under their inherent or natural resiliency, they grasp the two bars as is clearly depicted and maintain the food-holder in position, as is fully shown in the several views.

The main-body 11 is cut through on converging, intersecting lines 18, 18, leaving a pointed, triangular-shaped or tapered prong or spear 19 between them, the base or broad part of which is at one end of the section 11, while its pointed or sharp end is near the other end of the section 11.

Figure 5:
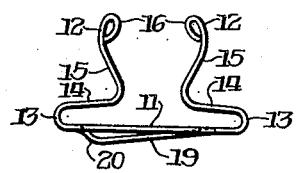
Figure 5 is a top edge view of the holder by itself when not applied to the cage and not holding any article of food.
Figure 3:
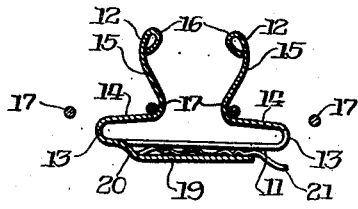
Figure 3 is a horizontal section on line 3—3 of Figure 1, showing the clamp holding an article of food, such as a piece of lettuce.
Figure 4:
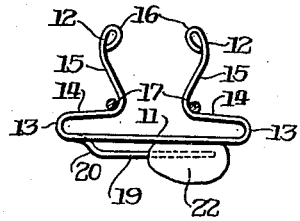
Figure 4 is a plan view illustrating the appliance holding another edible piece, such as a fragment of apple.

Such base portion is offset slightly outwardly of the plane of the part 11 at 20, and, when the holder is unsupplied with food, the point of the tongue or prong is in the plane of the element 11, as shown in Figure 5, so that the bird occupant of the cage cannot injure or damage itself thereon.

When the arms or handles 12, 12 are squeezed toward one another, the prong 19 is deflected outwardly and the portion 11 is flexed or bowed inwardly, or in the opposite direction, thus separating the parts 11 and 19 sufficiently for the easy introduction of the food, such as a portion of lettuce leaf 21, between the two, or the spearing of the food, such as a piece of apple 22, on the prong.

Upon release of the arms or handles, the clasp firmly clamps the esculent in place and in suitable position for ready consumption by the bird.

Thus the spring arms perform a double function in that they hold the clamp in place by engagement with the bird-cage bars and, in addition, they act as handles to manipulate the holder for the insertion or removal of the article of food.

Those acquainted with this art will readily understand that the invention as defined by the appended claims is not limited or restricted to the precise or exact details of the structure and that they may be changed or modified without departure from the heart and essence of the invention and without the sacrifice of any of its material benefits or advantages.

I claim:

1. A food-holder of the character described, comprising an elastic one-piece metal member having a main body with a pair of outstanding terminal arms at its opposite ends compressible toward one another to allow their introduction between the bars of a bird-cage and normally tending to separate sufficiently to cause them to maintain the holder in position by engagement with the bars of the cage, said main body being slit to provide a tongue joined thereto at its base only near one end of said main body, said main body and tongue being automatically separable upon contraction of said arms and automatically contractible on an article of food between them upon expansion of said arms into bar-engaging relation.

2. A food-holder of the character described, comprising an elastic one-piece metal member having a main body with a pair of outstanding terminal arms at its opposite ends compressible toward one another to allow their introduction between the bars of a bird-cage and normally tending to separate sufficiently to cause them to maintain the holder in position by engagement with the bars of the cage, said main body being slit on converging lines to provide a tapered, pointed spear joined to said main body in offset relation at its base only near one end of said main body, said main body and spear being automatically separable upon contraction of said arms and automatically contractible on an article of food between them upon expansion of said arms into bar-engaging relation, the point of said spear being substantially in the plane of said main body when the holder supports no article of food.

In witness whereof I have hereunto set my hand.

HARRY H. HILL.